United States Patent

Faure et al.

[11] 3,964,293
[45] June 22, 1976

[54] DEVICE FOR LOCATING AND/OR OBTURATING LEAKY TUBES IN HEAT-EXCHANGERS

[75] Inventors: Jean-Pierre Faure, Aix-en-Provence; Gilbert Michot, Pertuis, both of France

[73] Assignee: Commissariat a l'Energie Atomique, Paris, France

[22] Filed: June 30, 1975

[21] Appl. No.: 591,444

[30] Foreign Application Priority Data
July 8, 1974 France .............................. 74.23715

[52] U.S. Cl. .............................. 73/40.5 A; 73/49.8; 165/11; 165/76
[51] Int. Cl.² ...................... G01M 3/24; F28F 11/04
[58] Field of Search ........... 73/40.5 R, 40.5 A, 49.8; 165/11, 71, 76, 79

[56] References Cited
UNITED STATES PATENTS

| | | |
|---|---|---|
| 3,168,824 | 2/1965 | Florer et al. ...................... 73/40.5 R |
| 3,488,829 | 1/1970 | Boniface ............................... 165/71 |
| 3,691,609 | 9/1972 | Ice et al. ................................. 165/76 |
| 3,882,715 | 5/1975 | Slinger .................................... 73/46 |

*Primary Examiner*—S. Clement Swisher
*Attorney, Agent, or Firm*—William R. Woodward

[57] ABSTRACT

A device for obturating leaky tubes in heat exchangers, characterized in that it comprises a sleeve adapted to be sealingly mounted in an orifice, or port, of the upper wall of said heat-exchanger, a vertical stem provided, at the lower end thereof, with an arm of variable length at right angles to said stem, the free end of said arm being integral with an assembly carrying a deformable capsule with a vertical axis adapted to penetrate into one of said tubes and to obturate said tube after having been deformed, means integral with said assembly adapted to deform said capsule, means for dissociating said capsule from said assembly, means for carrying said arm to rotate about the vertical axis of said stem, means for vertically moving said arm and means for varying the length of said arm.

9 Claims, 6 Drawing Figures

DEVICE FOR LOCATING AND/OR OBTURATING LEAKY TUBES IN HEAT-EXCHANGERS

The present invention relates to a device permitting to locate and/or obturate leaky tubes in heat-exchangers.

More specifically, the invention relates to a device adapted to be inserted into a vertical tube heat-exchanger, more especially a heat-exchanger of the sodium-sodium type, said device permitting to introduce a sealing capsule into each end of a leaky tube, the said capsules gripping the tube-wall and, therefore, fully obturating said tube.

The invention also relates to a device similar to the above one, comprising, in addition, ultra-sonic detection means for detecting the leaky tube, or tubes, prior to obturating same.

It is known that, in liquid-sodium cooled reactors, the cooling device usually comprises three independent circuits; more specifically a first circuit constituted by a primary exchanger and a primary pump usually mounted in the reactor very vessel, permits to exchange calories between the primary sodium filling the vessel and the secondary sodium flowing through a sodium secondary circuit, in heat exchange with the primary-circuit sodium through said primary exchanger. Finaly, a water-containing third circuit exchanges calories with the secondary sodium and supplies electricity generating plants with power.

Usually, several parallel-mounted similar cooling-devices are provided.

Since the pressure within the sodium secondary circuit is slightly higher than that within the primary circuit, any leakage in the primary exchanger will accordingly cause a portion of the secondary sodium to flow into the primary circuit, i.e. into the reactor vessel. Now, for safety's sake and for a good operation of the reactor, it is imperative that the amount of primary sodium filling the reactor-vessel should be kept substantially constant;

Even though the primary exchanger leakage was small, the additional amount of sodium in the vessel might become substantial and above the admissible level after a certain period of operation.

It would then be necessary to withdraw a portion of the vessel sodium so as to restore the latter to its normal level. It will be easily understood that such a withdrawal has many drawback.

In particular, the thus-withdrawn sodium is activated, which makes it imperative to provide containers with a shielding against radiations for storing the primary sodium withdrawn. In addition, as is well known, the removal and storage of such containers entail many difficulties.

Accordingly, the object of the present invention is a device permitting to obturate both the upper end and the lower end of a heat-exchanger leaky tube, this device is adapted, according to a particular embodiment, to detect leaky tubes to be obturated, by carrying out an ultrasonic method.

The device according to the invention for obturating leaky tubes in heat-exchangers is characterized in that it comprises a sleeve adapted to be sealingly mounted in an orifice, or port, of the upper wall of said heat-exchanger, a vertical stem provided, at the lower end thereof, with an arm of variable length at right angles to said stem, the free end of said arm being integral with an assembly carrying a deformable capsule with a vertical axis adapted to penetrate into one said tubes and to obturate said tube after having been deformed, means integral with said assembly adapted to deform said capsule, means for dissociating said capsule from said assembly, means for causing said arm to rotate about the vertical axis of said stem, means for vertically moving said arm and means for varying the length of said arm.

According to a preferred embodiment, the device according to the invention is characterized in that said stem is constituted by a vertical tube provided, at the upper part thereof, with means for causing the said tube to rotate about the vertical axis thereof, said means being integral with said sleeve, the said tube forming a clevis with two vertical webs at the lower end thereof, a vertical sahft capable of sliding within said tube said shaft being rotatingly integral with said tube and being provided, at the upper end thereof, with translation means integral with said tube, said shaft being provided, at the lower end thereof, with a member adapted to slide between the webs of said clevis under the control of said shaft and a rod adapted to slide inside said tube with respect to which it is off-centered, and in said arm is constituted by a plurality of articulated deformable rhombs, one extremity of said arm being integral with the lower end of said rod and with said ene-member of said shaft, on the one hand, and with said capsule-carrying assembly, on the other hand.

According to another embodiment, the device comprises a vertical stem provided, at the lower end thereof, with an arm at right angles to said stem end of variable length, the free end of said arm being integral with an assembly carrying a vertical axis deformable capsule capable of penetrating into one of said tubes and of obturating said tube one deformed, and at least one ultrasonic transducer, the said transducer or transducers having vertical axes, means integral with said assembly for causing said capsule to be deformed means for dissociating said capsule from said assembly, means for causing said arm to rotate about the vertical axis of said stem, means for moving said arm vertically and means for causing the length of said arm to vary.

Various embodiments of the present invention will be given hereafter by way of examples, with reference to the accompanying drawing, in which.

Figure 1:
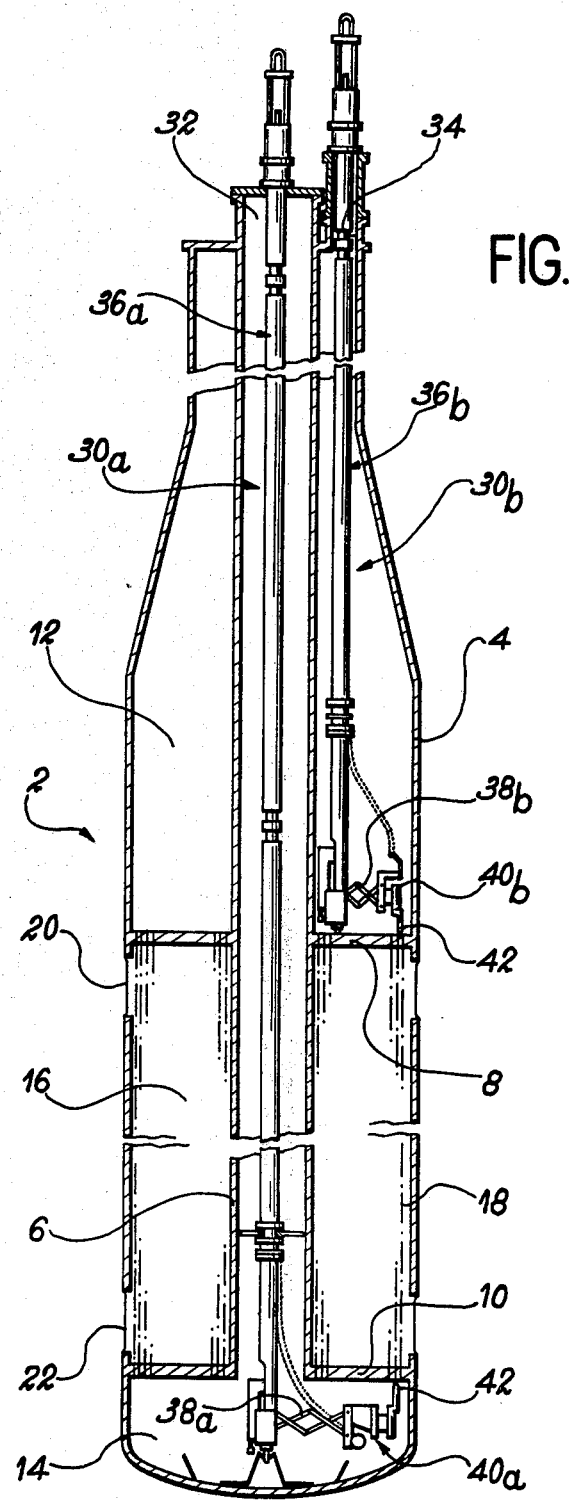
FIG. 1 is a cross-sectional elevation of a heat-exchanger in which is mounted the device according to the invention.

In FIG. 1 is shown a sodium-sodium primary exchanger 2 for fast neutron nuclear-reactors of the integrated type, said exchanger being immersed in the reactor vessel and suspended from the upper plete obturating the reactor vessel. This exchanger comprises an outer will 4 of substantially cylindrical shape. Along the exchanger axis, there is a central chimney, or flue, 6 opening into the exchanger upper extremity. Said central chimney 6 passes through an upper horizontal plate and a lower horizontal plate, 8 and 10 respectively. On the inner side of wall 4, these plates define an upper tank 12 and a lower tank 14, respectively, the latter communicating with central chimney 6. Plates 8 and 10 define between them a space 16 containing vertical tubes such as 18, the upper and lower ends of which are embedded in plates 8 and 10, respectively, so that said tubes cause the two tanks to communicate. (Hot) primary sodium flows downwardly through space 16, into which it penetrates through orifice, or part, 20 and which it leaves through orifice, or port, 22. (Cold) secondary sodium penetrates into the central chimney, or flue, through a conduit (not shown in FIG. 1) and enters into lower tank 14. Said secondary sodium then flows along tubes 18, through the walls of which it receives heat from the primary sodium, and penetrates into upper tank 12 which it leaves through a conduit, not shown in the figure.

FIG. 1 also shows the obturating device (30) according to the invention, the first embodiment 30a of which is adapted to obturate the lower extremities of tubes 18 (at the level of plate 10), whereas its second embodiment 30b is adapted to obturate the upper extremities of tubes 18 (at the level of plate 8). Device 30a is introduced into central chimney, a flue, 6 through orifice 32 which is an extension of chimney 6, whereas device 30b is introduced into upper tank 12 through orifices, such as 34, in plate 36 which closes upper tank 12.

Each device 30 essentiallu comprises a vertical stem, (36a and 36b respectively), a horizontal arm (38a and 38b, respectively) and, at the arm end, an assembly (40a and 40b, respectively) for carrying an obturating capsule 42.

Figure 2:
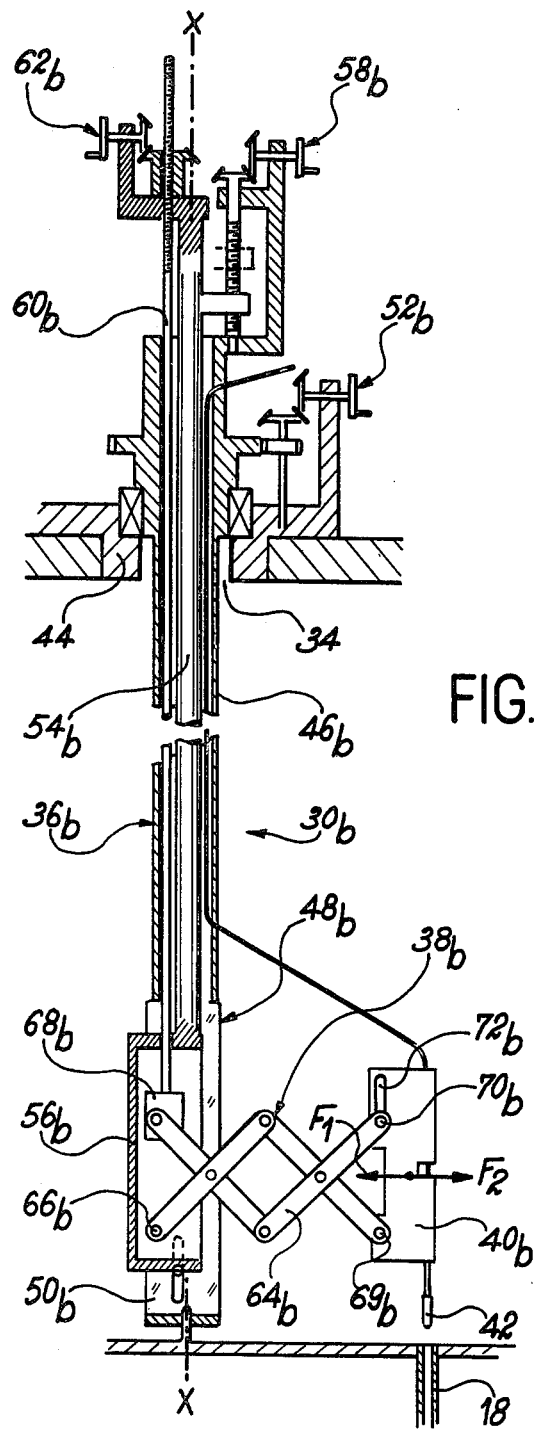
FIG. 2 is a somewhat diagrammatic view of said device.

FIG. 2 shows device 30b, in simplified form; device 30a is similar to 30b, with the exception of a few particulars to be specified later on.

The device according to the invention comprises a carrier sleeve 44 integral with the exchanger wall, inserted into orifice, or port, 34. Stem 36b, resting at the upper portion thereof on sleeve 44 through bearings, comprises a vertical tube 46b terminating, at the lower portion thereof, in a clevis 48b, one web of which only is visible (50b). At its upper portion, said tube comprises mechanical members cooperating with driving means integral with sleeve 44 and allowing tube 46b to rotate about its vertical axis XX.

The whole assembly, designated by reference numeral 52b, will be explained in more detail later one inside tube 46b is a shaft 54b having the same axis with tube 46b. The lower end of shaft 54b *lies between the webs of clevis 48b*. A member 56b is fixed to the lower end of shaft 54b and therefore lies inside clevis 48b.

At the upper end thereof, emerginf from tube 46b, shaft 54b is provided with mechanical members cooperating with driwing means integral with tube 46b, said driving means enabling shaft 54b to slide within tube 46b along axis XX.

The assembly of these members is designated by reference numeral 58b. Finally, inside tube 46b there is also a vertical rod 60, off-centered with respect to axis XX'.

Rod 60b is provided, at its upper end, with mechanical members cooperating with driving means integral with the upper end of shaft 54b.

The whole assembly, designated by reference numeral 62b, *permits to drive rod 60b* with respect to shaft 54b in the vertical direction.

Arm 38b is constituted by a plurality of articulated deformable rhombs, formed of links 64b. At one of its extremities, arm 38b is articulated about pin 66b integral with member 56b and about end-portion 68b or rod 60b; at the other end thereof, arm 38 is articulated about pin 69b integral with assembly 40b and about pin 70b, slidable along vertical slot 72b of assembly 40b.

The operation of the device according to the invention will be readily understand by means of this diagrammatic drawing: through the actuation of assembly 52b, tube 46b is caused to rotate about axis XX'.

This tube thus rotatingly drives shaft 54b, rod 60b, arm 38b and therefore capsule 42.

Through the actuation of assembly 62b, rod 60b is caused to slide. It will be easily understood that the upward movement of rod 60b causes arm 38b to shorten and, therefore, drives assembly 40b in the direction of arrow F, and that, on the other hand, the downward movement of rod 60b increases the length of arm 38b and, therefore, drives assembly 40b in the direction of arrow $F_2$. Through these two movements, it is possible to bring capsule 42 above each tube 18 or, at least, into the area scanned by the arm in its most extended position.

The insertion of capsule 42 into the upper end of tube 18 merely requires lowaring assembly 40b without altering the position thereof in a horizontal plane. This result is achieved by actuating assembly 58b. Thus, shaft 54b and rod 60b are simultaneously lowered. Assembly 40b is therefore lowered, but the length of arm 38b remains unchanged.

Figure 3:
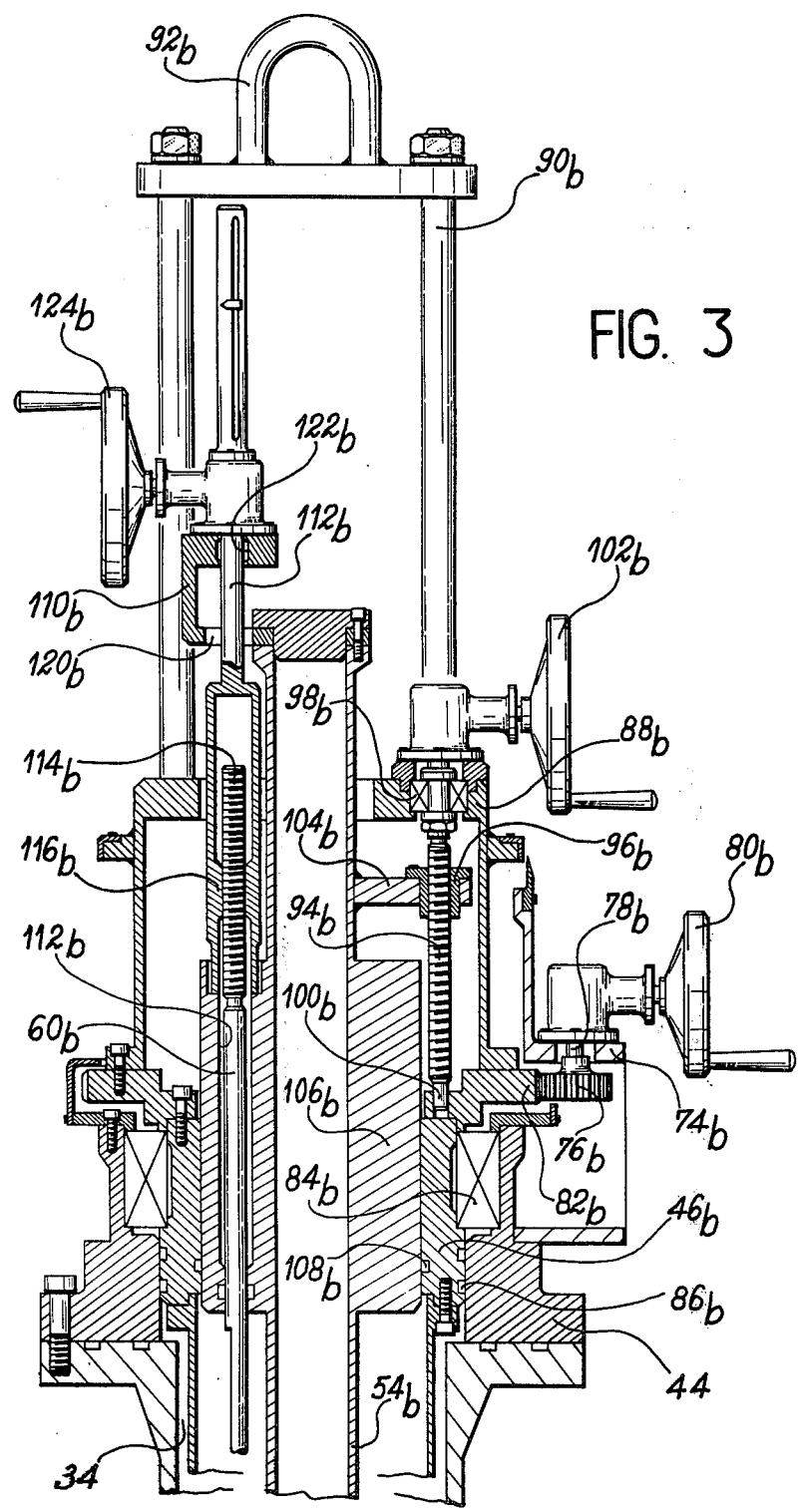
FIG. 3 is a cross-sectional elevation of the upper portion of said device.

FIG. 3 shows a particular embodiment of the upper portion of the device according to the invention.

Sleeve 44, sealingly fixed to the exchanger upper wall in register with orifice 34, is provided with a plate 74b adapted to support driving members 52b. The latter comprise a pinion 76b, the axle (78b) of which passes through plate 74b and is driven by handle 80b. Pinion 76b meshes with toothed wheel 82b integral with the upper end of tube 46b. The latter rests on sleeve 44 through bearings 84b. Tightness between sleeve 44 and tube 46b is ensured by sealing joints 86b.

Tube 46b, at the upper portion thereof is integral with a plate 88b adapted to support members 58b. To plate 88b is also fixed a gripping assembly 90b provided with a ring 92b. Said assembly permits to position the device on sleeve 44.

Assembly 58b essentially comprises a vertical threaded rod 94b and an internally threaded nut 96b. Threaded rod 94b can rotate in bearing 98b provided in plate 88b for preventing the screw translation and in blind hole 100b provided in toothed wheel 82b. Threaded rod 94b is driven by handle 102b. Nut 96b is integral with arm 104b, in its turn welded to shaft 54b. It can be seen that, by rotating, threaded rod 94b causes shaft 54b to move upwardly or downwardly.

Shaft 54b, comprises an enlarged portion 106b, the outer surface of which is applied against the inner surface of tube 46b.

Tightness between these two parts is ensured by sealing joints 108b.

At the upper end of shaft 54b is a U-shaped member 110b for supporting assembly 62b.

The upper end of rod 60b pases through bore 112b of enlarged portion 106b. Rod 60b terminates, at its upper portion, in a screw-thread 114b cooperating with nut 116b driven by axle 112b which pases through bores 120b and 122b of member 110b.

Said axle 112b is actuated by handle 124b.

Rod 60b is prevented from rotating with respect to tube 54b by a scries of keys and keyways.

Figure 4:
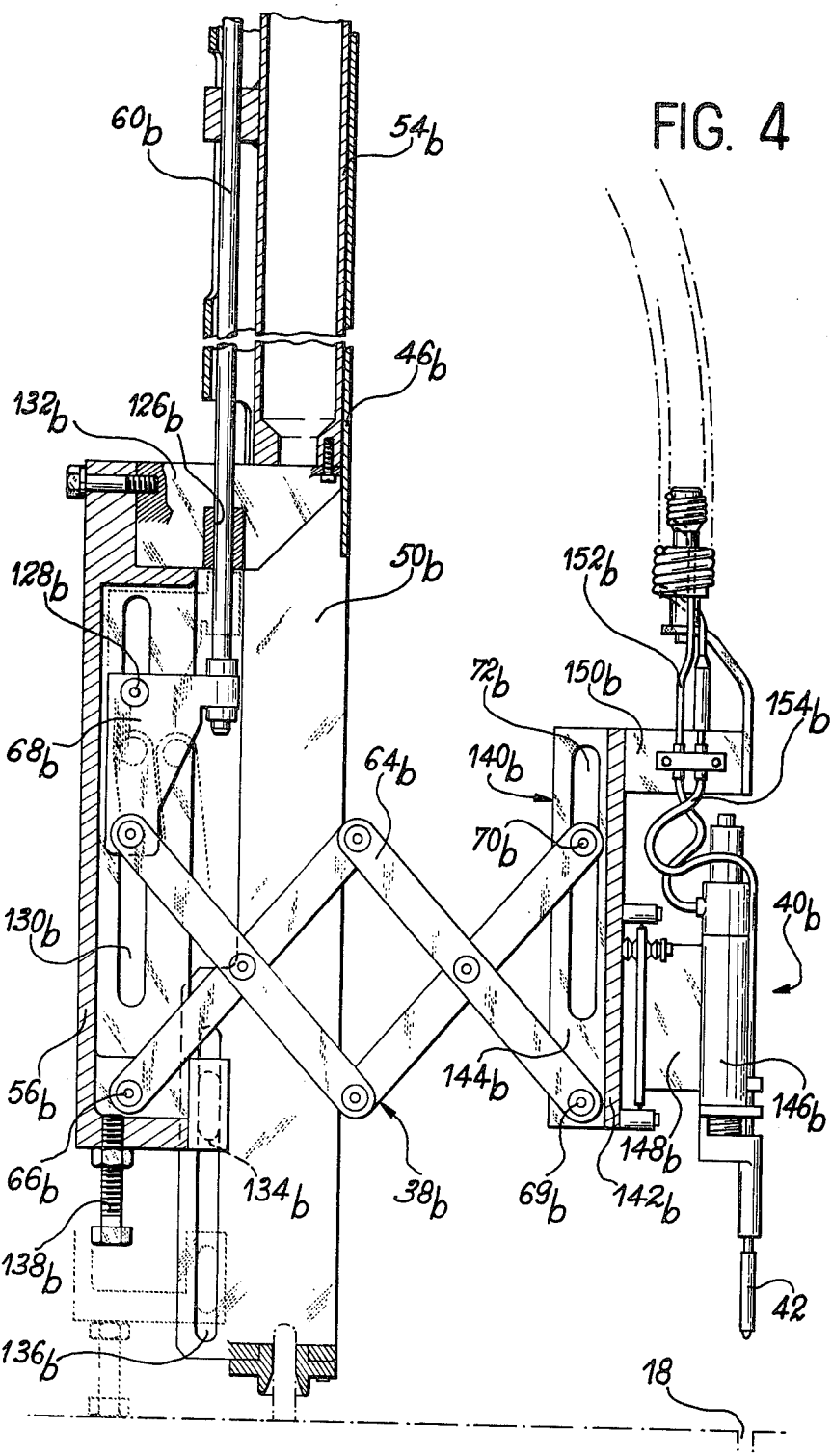
FIG. 4 is a cross-sectional elevation of the lower portion of said device.

In FIG. 4 is shown the lower portion of the obturating device. Member 56b is connected to the lower end of shaft 54b by means of member 132b.

The lower end of rod 60b passes through a vertical bore 126b of member 132b member 68b carries a pin 128b movable along a vertical guide slot 130b of member 56b.

Member 56b is guided in translation by a pin 134b sliding along slot 136b provided in web 50b of clevis 48b. Finally, member 56b comprises an adjustable abutment 138b for limiting the downward stroke of shaft 54b.

Carrying assembly 40b comprises a frame 140b constituted by a plate 142b having a flange 144b, in which is provided slot 72b and in which pin 69b journals. This frame carries the body 146b of a jack, at the end of which is fixed capsule 42. Jack 146b is connected to frame 140b by arm 148b and a resilient coupling allowing a slight shift of said jack and, therefore, of the capsule axis with respect to firme 140b, which remains vertical. There is also provided an arm 150b carrying pressurized air conduits 152b, 154b for feeding jack 146b and dssociating capsule 42 from the jack rod, and for feeding capsule 42 and deforming it once it has been introduced into tube 18, respectively.

Figure 5:
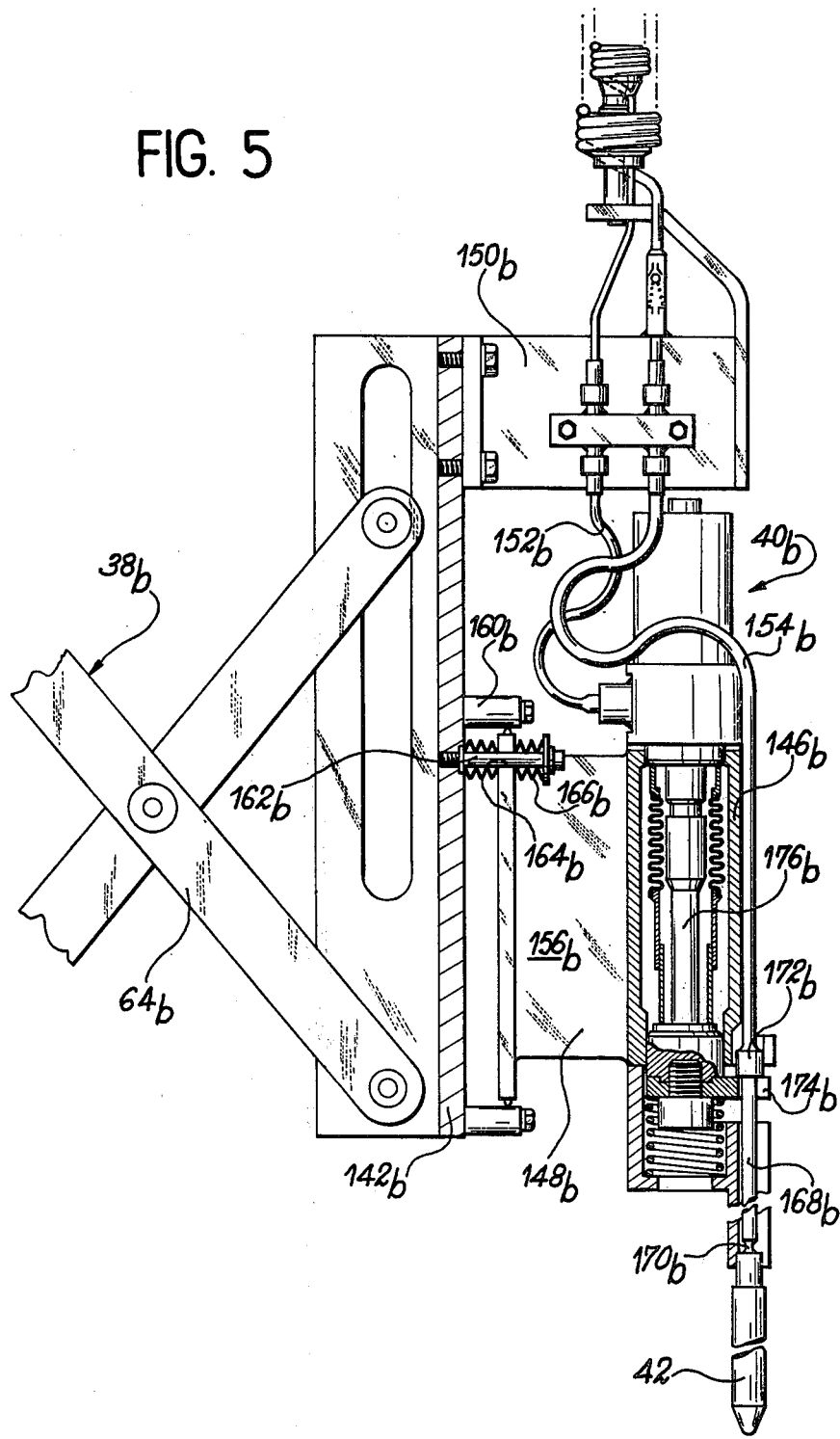
FIG. 5 is a cross-sectional elevation of the capsule-carrying assembly for obturatin the tube upper ends.

FIG. 5 shows carrying assembly 40b in detail.

Arm 148b is connected to frame 140b through a resilient coupling. Plate 156b is guided by four columns such as 160b (two of them only are shown in the figure) and by the four resilient assemblies (only one of which is shown), each of which comprises an axle 162b integral with plate 142b, passing through a bore 164b of plate 156b, and resilient washers 166b.

Capsule 42 is connected to conduit 154b through a tube 168b provided with a groove 170b at the junction of tube 168b with capsule 42, where occurs the dissociation of the capsule from the carrying assembly. At the junction of tube 168b with conduit 154b, there is a shoulder 172b resting on fork 174b integral with rod 176b of jack 146b. Through actuation of the jack, the capsule is dissociated from tube 168b by rupturing the latter at the level of groove 170b.

Figure 6:
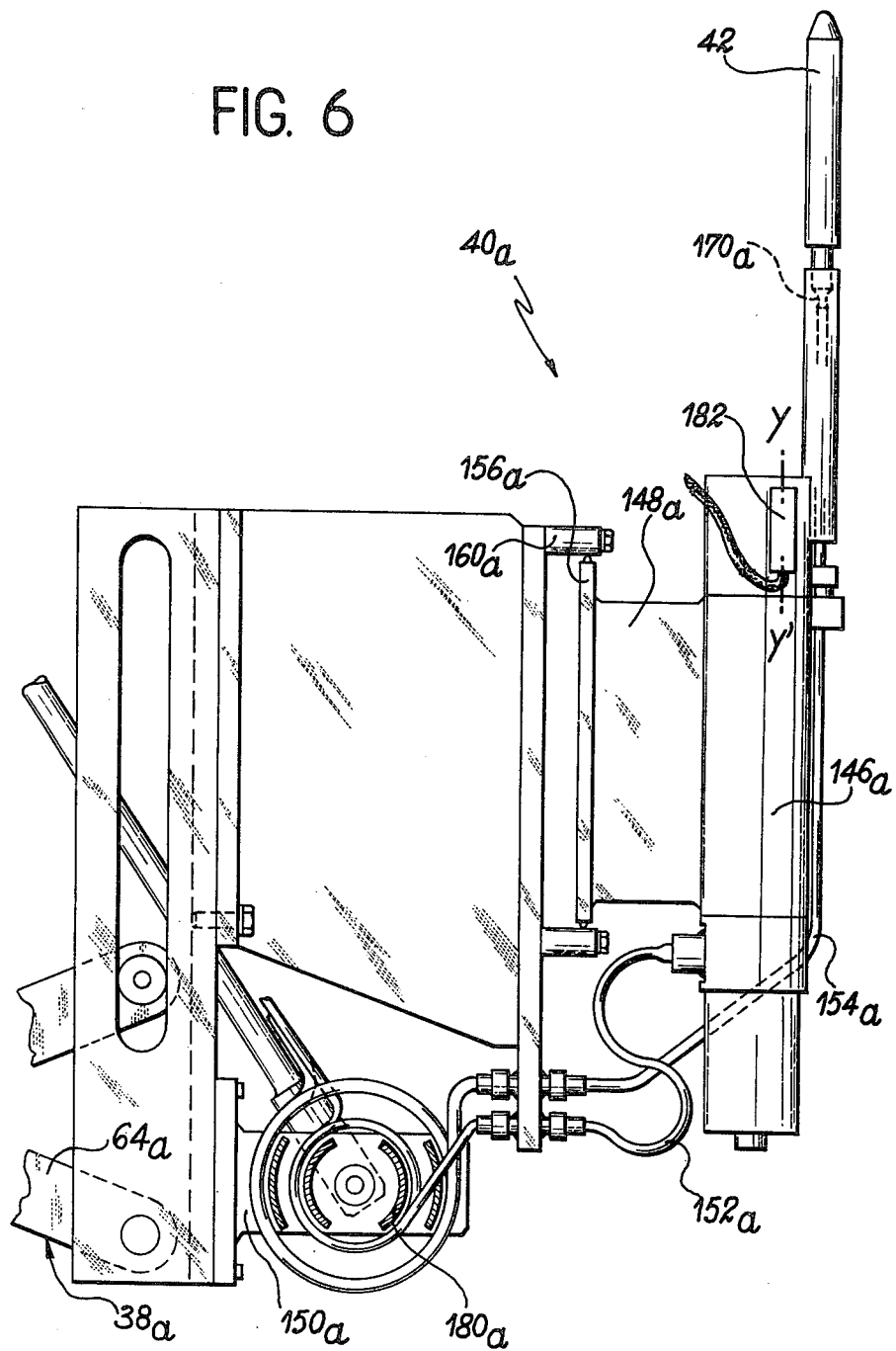
FIG. 6 is a view in elevation of the capsule-carrying assembly for obturating the tube lower ends.

In FIG. 6 is shown carrying assembly 40a, viz. the carrying assembly for inserting capsules into the lower end-portions of the tubes. Said assembly 40a essentially differs from assembly 40b in that jack 146a is turned upwardly instead of downwardly. In addition arm 150a, corresponding to arm 150b, carries members 180a for guiding and winding conduits 152a and 152b. The other members are similar to these described with respect to FIG. 5, and bear the same reference numerals with the suffix a.

As can be readily seem in FIG. 1, the stem 36a of device 30a should be longer than that of device 30b. In fact, one an d the same device can be used for carrying out both operations. The passage from one type of operation th the other merely requires mounting an extension of the stem, which means extending tube 46b, shaft 54b and rod 60b.

Of course, it is also required to exchange carrying assembly 40b for carrying assembly 40a.

In FIG. 6 is shown a variant of the device which is of special interest. According to this variant, carrying assembly 40a is provided with two ultrasonic transducers 182, 182' (of which 182 only is visible). These transducers have a vertical axis YY' and are mounted on both sides of jack 146a, symmetrically with respect to the latter. Each of said transducers is connected to a cable 184 for transmitting the electrical signal generated by the ultrasonic waves feeding the respective transducer.

This embodiment of the device according to the invention permits to carry out the above described method for detecting and locating a leaky tube.

In a first step, the reactor power is reduced or even fully annihilated, then the flow of secondary sodium is caused to stop. The device is inserted into central chimney, or flue, 6, until the lower ene-portion thereof abuts tank 14.

An overpressure of inert gas (e.g., argon), is applied in the two tubes 12 and 14. The secondary sodium contained in tubes 18 is expelled little by little-and, in the meantime, the inert gas fills upper tank 12 and penetrates into tubes 18, so that the liquid sodium-gas interface is gradually lower and lower in each tube. it is observed that, whenever said interface reaches the level of a leak in a tube, a sonic wave is emitted. A leaky tube will act as a wave-guide and the ultrasonic waves wile appear in the lower portion of the respective tube. Three propagation modes are generated, viz. a propagation through the tube wall, another one through the sodium contained in the tube and a third one through the gas contained in said tube above the leak level. Any contingent ultrasonic wave will be detected by scanning lower tube-plate 10 by means of an ultrasonic transducer, the latter being maintained at a constant distance from said plate. By means of that transducer, a maximal signal is collected when said transducer is in register with the leaky tube.

By means of the control members, the associated two transducers are caused to move above each tube 18 of the lower tube-plate.

As explained above, wherever the sodium-gas interface reaches a leak in a tube, an ultrasonic wave is generated and detected by the transducers. Once a leaky tube has been detected, the device according to the invention is in position for obturating the tube lower end-portion. The above-mentioned operating steps are then carried out: carrying assembly 40a is raised until the capsule has ponctuated sufficiently deeply into leaky tube 18. A fluid at a pressure of about 1,500 bars, is sent into deformable capsule 42, via conduit 152a, which causes said capsule to expand and adhere to the tube, thus sealingly obturating the latter. Then, jack 146a is actuated for dissociating the capsule from the device. In order to carry out another detecting and obturating step, it is necessary to extract the device from the exchanger with a view to mounting a new capsule with its tube 168a at the extremity of conduit 154a. Another advantage of this embodiment lies in the high accuracy obtainable in positioning the capsules with respect to tubes 18. Indeed, in order to make sure that a capsule is duly positioned with respect to a leaky tube, all that is required is to move the capsule until signals of the same amplitude are obtained on both transducers.

The same operating steps are carried out with the upper tube-plate.

It is to be noted that it would be feasible to use a device comprising but one ultrasonic transucer. In such case, in view of the off-centering of the transducer with respect to the capsule, one would have to shift the carrying assembly by a small amount between the detection step and the obturation step.

In addition, the fluid-deformable capsule may be exchanged for a capsule deformable by means of a magnetic core. In such case, conduits 152 and 154 are, of course, charged to electrical leads.

Since, the device as a whole is operated in hot liquid sodium, its parts should, of course, be made of a steel compatible with the severe operating conditions of the device, at least as regards these parts that are immersed in the exchanger. Preferably, use should be made of a stainless steel of the Z3CN 18/10 grade.

What is claimed is:

1. A device for obturating leaky tubes in heat exchangers, characterized in that it comprises a sleeve adapted to be sealingly mounted in an orifice, or port, of the upper wall of said heat-exchanger, a vertical stem provided, at the lower end thereof, with an arm of variable length at right angles to said stem, the free end of said arm being integral with an assembly carrying a deformable capsule with a vertical axis adapted to penetrate into one of said tubes and to obturate said tube after having been deformed, means integral with said assembly adapted to deform said capsule, means for dissociating said capsule from said assembly, means for carrying said arm to rotate about the vertical axis of said stem, means for vertically moving said arm and means for varying the length of said arm.

2. A device according to claim 1, characterized in that said stem is constituted by a vertical tube provided, at the upper part thereof, with means for causing the said tube to rotate about the vertical axis thereof, said means being integral with said sleeve, the said tube forming a clevis with two vertical webs at the lower end thereof, said tube containing a vertical shaft in sliding relationship therewith, said shaft being rotatingly integral with said tube and being provided, at the upper end thereof, with translation means integral with said tube, said shaft being provided, at the lower end thereof, with a member adapted to slide between the webs of said clevis under the control of said shaft and a rod adapted to slide inside said tube with respect to which it is off-centered, and in that said arm is constituted by a plurality of articulated deformable rhombs, one extremity of said arm being integral with the lower end of said rod and with said end-member of said shaft, on the one hand, and with said capsule-carrying assembly, on the other hand.

3. A device for locating leaky tubes and obturating said tubes, characterized in that it comprises a vertical stem provided, at the lower end thereof, with an arm at right angles to said stem end of variable length, the free end of said arm being integral with an assembly carrying a vertical axis deformable capsule capable of penetrating into one of said tubes and of obturating said tube once deformed, and at least one ultrasonic transducer, the said transducer or transducers having vertical axes, means integral with said assembly for causing said capsule to be deformed, means for dissociating said capsule from said assembly, means for causing said arm to rotate about the vertical axis of said stem, means for moving said arm vertically and means for causing the length of said arm to vary.

4. A device according to claim 3, characterized in that said stem is constituted by a vertical tube provided, at the upper part thereof, with means for causing the said tube to rotate about the vertical axis thereof, said means being integral with said sleeve, the said tube forming a clevis with two vertical webs at the lower end thereof, a vertical shaft capable of sliding within said tube, said shaft being rotatingly integral with said tube and being provided, at the upper end thereof, with translation means integral with said tube, said shaft being provided, at the lower end thereof, with a member adapted to slide between the webs of said clevis under the control of said shaft and a rod adapted to slide inside said tube with respect to which it is off-centered, and in that said arm is constituted by a plurality of articulated deformable rhombs, one extremity of said arm being integral with the lower end of said rod and with said end-member of said shaft, on the one hand, and with said capsule-carrying assembly, on the other hand.

5. A device according to claim 3, characterized in that said capsule carrying assembly comprises ultrasonic transducers symmetrically arranged on both sides of said capsule, said transducers having vertical axes spaced by a distance which is substantially equal to the spacing between two adjacent tubes of said exchanger.

6. A device according to claim 5, characterized in that the means for rotating said tube comprise a toothed wheel integral with the upper end of said tube, said wheel being in wesh with a toothed pinion fixed to an axle passing through a bearing integral with said sleeve, said axle bieng actuated by a handle.

7. A device according to claim 6, characterized in that the means for translating said shaft with respect to said tube comprise a threaded rod having a vertical axis, integral with an extension of said tube and prevented from longitudinally moving, said threaded rod being adapted to drive an internally-threaded nut integral with said shaft.

8. A device according to claim 7, characterized in that the means for causing said rod to slide are constituted by a threaded rod integral with said rod and extending the latter, and by an internally-threaded member in wesh with said threaded rod, said member being driven by an axle rotating in a bearing integral with the upper end of said rod, said axle being driven by a handle.

9. A device according to claim 8, characterized in that said capsule-carrying assembly comprises a frame about which one end-portion of said arm is articulated, a vertical axis hydraulic jack, the body of which is fixed to said frame through a resilient connection, and a vertical rigid tube extending said capsule connected, at its free end, to a pressurized-fluid inlet conduit, said tube comprising a groove at the level of its junction with said capsule, and a shoulder resting on a fork integral with the end-portion of the jack mobile rod.

* * * * *